United States Patent [19]

Stiles

[11] Patent Number: 5,895,543
[45] Date of Patent: Apr. 20, 1999

[54] CLAMPING APPARATUS FOR AN ELECTROFUSION JOINT

[75] Inventor: Terry L. Stiles, Tecumseh, Okla.

[73] Assignee: Central Plastics Company, Shawnee, Okla.

[21] Appl. No.: 09/059,232

[22] Filed: Apr. 13, 1998

Related U.S. Application Data

[62] Division of application No. 08/587,630, Jan. 17, 1996, Pat. No. 5,798,021.

[51] Int. Cl.⁶ .................................. B25B 5/14
[52] U.S. Cl. .................. 156/274.2; 156/304.2; 156/304.6; 156/308.2
[58] Field of Search .................. 156/274.2, 304.2, 156/499, 556, 580, 304.6, 308.2; 285/21.1, 21.2, 21.3; 219/535; 269/49; 254/131; 29/890.148; 405/135; 85/9 R; 411/340, 345

[56] References Cited

U.S. PATENT DOCUMENTS

| | | |
|---|---|---|
| 4,486,650 | 12/1984 | Bridgstock et al. . |
| 4,615,514 | 10/1986 | Hamlin . |
| 4,927,476 | 5/1990 | Watkins . |
| 5,129,636 | 7/1992 | Bridgstock et al. . |

OTHER PUBLICATIONS

Central Plastics Company Flyer entitled "Polyethylene Saddles for Lateral Service Connections" (undated but admitted to be prior art).

Central Plastics Company "Electrofusion Systems Computer Controlled Fusion Operation and Training Manual" (undated but admitted to be prior art).

Central Plastics Company brochure entitled "Fusion Procedures Butt, Socket, Saddle" (undated but admitted to be prior art).

*Primary Examiner*—Michael W. Bell
*Assistant Examiner*—Sam Chuan Yao
*Attorney, Agent, or Firm*—McAfee & Taft

[57] ABSTRACT

A clamping apparatus for use in clamping a fitting to a pipe or other fitting. The apparatus may be used without supporting the outer surface of the pipe on the opposite side of the fitting, and in the case of a buried pipe, only a portion of the pipe needs to be excavated. The apparatus comprises a clamping plate for engaging an outer surface of the fitting with an adjusting stem threadingly engaged with the clamping plate. A locking bar is pivotally and rotatably attached to an end of the adjusting stem. A weight differential between long and short ends of said locking bar and a cable are used to pivot the locking bar between a first position thereof wherein the locking bar and a portion of the stem may be inserted through aligned openings in the fitting and pipe and a second position. In the second position, the clamping bar may be clampingly engaged with an inner surface of the pipe by rotation of the adjusting stem which also results in the clamping plate being clampingly engaged with an outer surface of the fitting. A lock nut locks the apparatus in the clamping position. The fitting may then be permanently attached to the pipe, such as by an electrofusion process, after which the apparatus may be unclamped and removed. A method of attaching a fitting to a pipe using the apparatus is also disclosed.

6 Claims, 3 Drawing Sheets

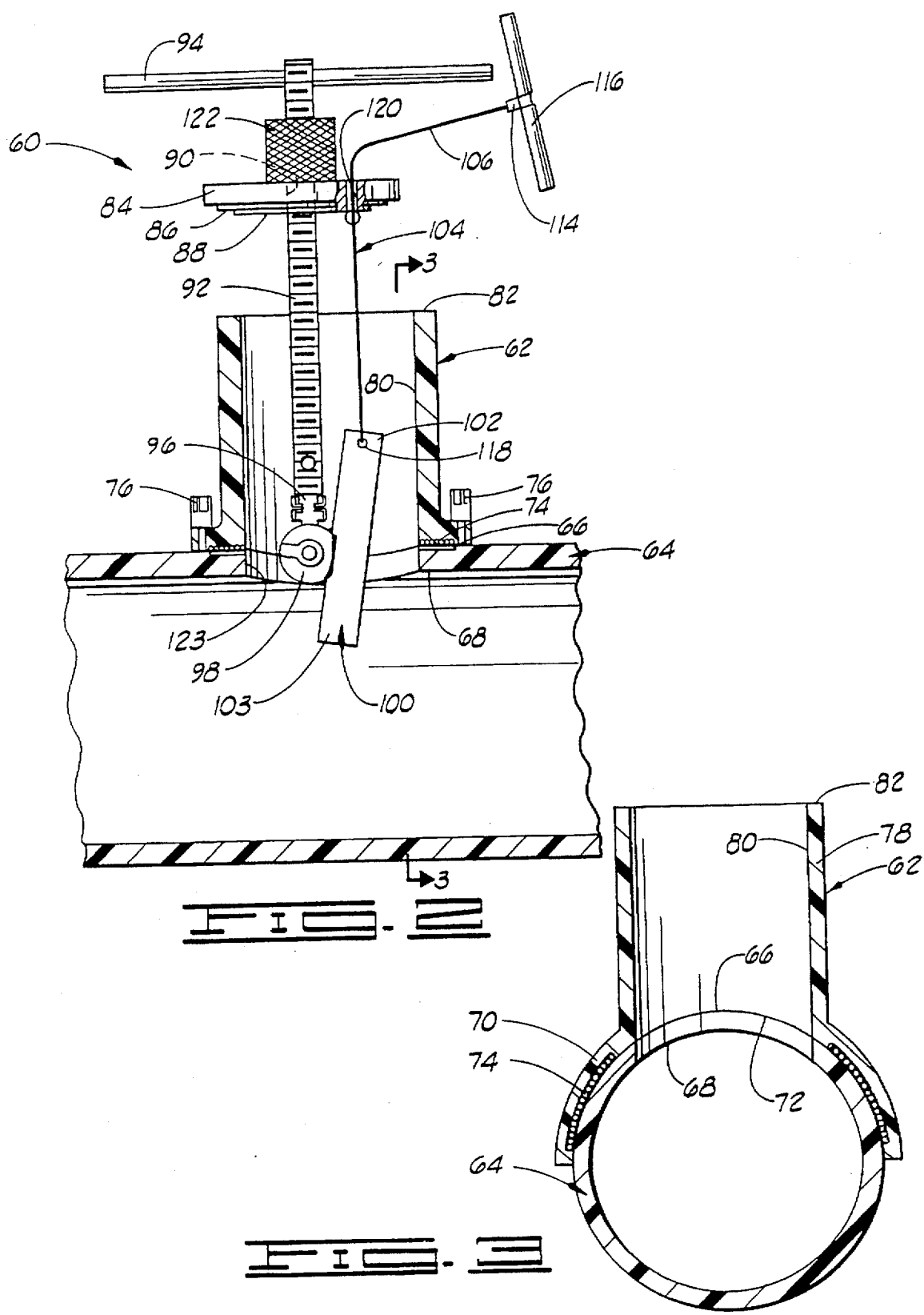

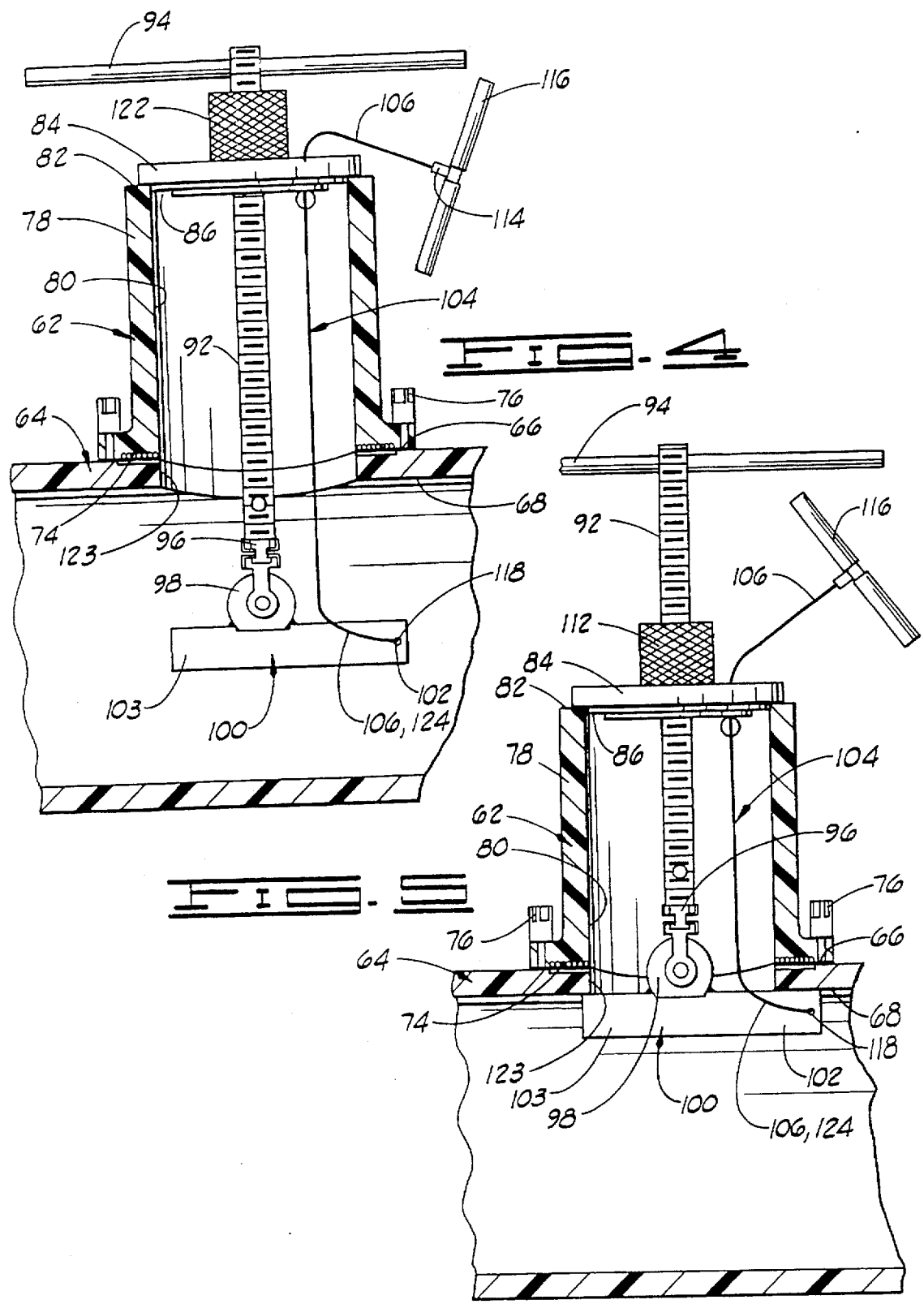

CLAMPING APPARATUS FOR AN ELECTROFUSION JOINT

This application is a division of Ser. No. 08/587,630 filed on Jan. 17, 1996 now U.S. Pat. No. 5,798,021.

BACKGROUND OF THE INVENTION

1. Field of the Invention

This invention relates to apparatus for clamping a fitting to a pipe such as during an electrofusion process, and more particularly to a clamping apparatus which is installed from only one side of the pipe and does not require support on the opposite side thereof.

2. Description of the Prior Art

Plastic pipe and fittings are now widely used in a great variety of applications. Such fittings and pipe are frequently connected using adhesives. However, adhesives may not seal completely if not carefully applied, and in some cases, the adhesives themselves may be hazardous.

A recent development is the use of electrofusion fittings. Such fittings comprise a body of thermoplastic material having an electrical resistance heating or fusing element molded into the fitting adjacent to a surface of the body. In operation, an electric current is supplied to the electrofusion element which causes it to heat so that the thermoplastic material in the pipe is melted or softened and thereby the fitting is fused or welded to the pipe or another fitting. Electrofusion has the advantages of eliminating adhesives and providing a satisfactory, consistent connection between the plastic components. This reduces the likelihood of bad connections and the resultant leakage.

One known fusing procedure is to attach a saddle joint to a length of pipe. The saddle joint can comprise one or more connections so that another line may be connected and tapped into the original pipe. Also, other elements, such as valves, etc., may be connected to the pipe in this way.

In attaching a fusion saddle joint, a known clamping apparatus is typically positioned around the pipe. This clamping apparatus has a mechanism for clamping the fitting to one side of the pipe and clamping against the opposite side of the pipe so that the fitting is held in place during the fusion process. That is, such prior art clamping devices require support of the pipe on the opposite side from the saddle fitting to be attached.

Such a clamping apparatus have worked well, but in some applications, it is not convenient to use because it requires support on the opposite side of the pipe. For example, the location of the pipe may prevent the positioning of a support thereunder. Also, in the case of buried pipe, to use such clamping apparatus, it is necessary to totally excavate around the pipe so that the apparatus can be positioned under the pipe.

Therefore, there is a need for an apparatus which does not require a support on the opposite side of the pipe and which can be installed from only one side of the pipe. The clamping apparatus of the present invention meets this need and can be installed from one side of the pipe. It clamps the fitting and an inner surface of the pipe, thus being usable in situations where a support under the pipe is not practicable or would add additional costs, such as where a pipe portion is buried.

SUMMARY OF THE INVENTION

The clamping apparatus of the present invention is designed primarily for use in an electrofusion process wherein a plastic fitting is fused to a length of plastic pipe or other fitting. However, it can be used when fittings and pipe or other fittings are joined by other processes as well.

The clamping apparatus is designed for use with a fitting positioned adjacent to an opening formed in a length of pipe and comprises a first portion adapted for engaging an outer surface of the fitting, a second portion adapted for engaging an inner surface of the pipe, and means for moving the first and second portions to a clamping position thereof, wherein the fitting is clamped against the pipe. The means for moving the first and second portions is preferably characterized by an adjusting stem threadingly engaged with one of the first and second portions. The first portion may comprise a clamping plate, and the second portion may comprise a locking bar pivotally attached to the adjusting stem. The locking bar may also be rotatably attached to the adjusting stem.

The apparatus further comprises means for pivoting the locking bar between first and second positions thereof with respect to the adjusting stem. In the first position, the adjusting stem and locking bar may be inserted through an opening in the fitting and the opening in the pipe, and in the second position, the locking bar may be clampingly engaged against an inner surface of the pipe.

The locking bar preferably has a long end and a short end extending from the point of pivotation with respect to the adjusting stem. This results in a weight differential between the long and short ends which tends to cause the locking bar to rotate from the first position to the second position thereof. Thus, the means for pivoting may be characterized at least in part by this weight differential on the locking bar. The means for pivoting may be further characterized by a cable attached to the locking bar and extending out of the fitting. The cable is preferably attached to the long end of the locking bar so that tension may be applied to the cable to pull on the long end to overcome the tendency to rotate due to the weight differential. In one embodiment, the cable extends through a hole in the first portion.

Actuation of the stem by rotation thereof with respect to the clamping plate allows the first and second portions to be relatively moved between an unclamped position and a clamping position. The apparatus further comprises locking means for locking the adjusting stem with respect to the clamping plate and thereby locking the first and second portions in the clamping position thereof.

The present invention also provides a method of attaching a fitting to a pipe comprising the steps of providing a pipe opening in the pipe, positioning the fitting against an outer surface of the pipe such that a fitting opening defined in the fitting is substantially aligned with the pipe opening, positioning a clamping apparatus adjacent to the fitting so that a portion of the clamping apparatus extends through the aligned fitting and pipe openings, and actuating the clamping apparatus to a clamping position such that an outer surface of the fitting and an inner fitting of the pipe are clampingly engaged so that the fitting is thereby clamped against the pipe. In an electrofusion process, the method further comprises the steps of providing the pipe made of a plastic material, providing the fitting made of a plastic material and having a fusing element formed thereon, and activating the fusing element when the clamping apparatus is in the clamping position thereof such that the fitting is fused to the pipe. After fusion has been completed, method comprises the additional steps of deactivating the fusing element, actuating the clamping apparatus to its unclamped position, and withdrawing the clamping apparatus through the aligned fitting and pipe openings. In the case of a buried pipe, only a portion thereof needs to be excavated because the apparatus and method do not require complete excavation or support on the bottom side of the pipe.

Numerous objects and advantages of the invention will become apparent as the following detailed description of the preferred embodiment is read in conjunction with the drawings illustrating such embodiment.

BRIEF DESCRIPTION OF THE DRAWINGS

FIG. 2 illustrates the clamping apparatus for an electrofusion joint of the present invention in an initial position adjacent to a fitting and a portion of a length of pipe.

FIG. 3 is a cross section taken along lines 3—3 in FIG. 2 showing the pipe and electrofusion fitting to be attached thereto.

FIG. 4 shows the clamping apparatus in an intermediate position during a clamping operation.

FIG. 5 is a cross-sectional view of the clamping apparatus shown in a clamped position holding the electrofusion fitting to the pipe for use in an electrofusion operation.

DESCRIPTION OF A PRIOR ART CLAMPING APPARATUS

Figure 1:
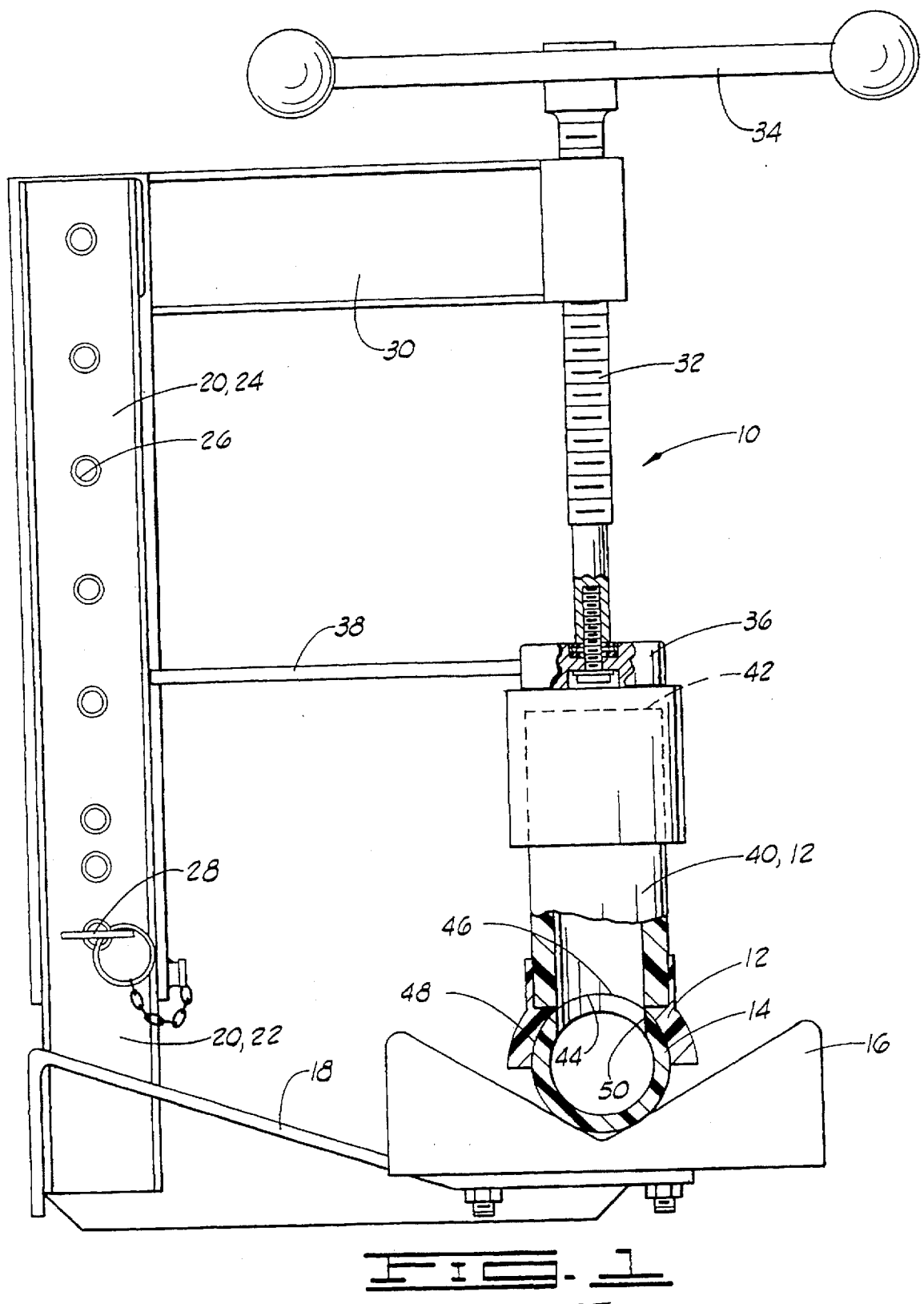
FIG. 1 illustrates a prior art clamping apparatus which clamps a saddle fitting to a pipe while providing support to the opposite side of the pipe.

Referring now to FIG. 1 of the drawings, a prior art clamping apparatus is shown and generally designated by the numeral 10. Apparatus 10 is used to clamp a fitting, such as electrofusion saddle fitting 12, to a pipe 14. If pipe 14 is buried, it is first necessary to excavate completely around the pipe so that there is a gap therebelow.

Prior art clamping apparatus 10 comprises a saddle vee 16 which is mounted on the distal end of a lower bracket 18. The proximate end of lower bracket 18 is connected to an adjustable frame 20 at a lower portion 22 thereof. An upper portion 24 of frame 20 slides with respect to lower portion 22. The height of frame 20 is adjusted as desired so that at least one hole 26 in upper portion 24 thereof is aligned with a corresponding hole in lower portion 22. A lock pin 28 is inserted through the aligned holes so that the height of frame 20 is set and upper and lower portions 22 and 24 are locked in place. At the upper end of upper portion 24 is an upper bracket 30.

A screw member 32 is threadingly engaged with a distal end of upper bracket 30 and rotatingly actuated by a handle 34. A lower end of screw member 32 is connected to, and rotatably received in, a fitting adapter 36. Fitting adapter 36 may be at least partially supported by an intermediate bracket 38.

A neck portion 40 of fitting 12 is received within adapter 36.

In operation, saddle vee 16 is positioned under pipe 14, and adapter 36 is positioned over neck portion 40 of fitting 12. The length of frame 20 is adjusted as previously described, and screw member 32 of clamping apparatus 10 is rotated by handle 34 such that adapter 36 is clampingly engaged with an upper end 42 of fitting 12. An inner surface 44 of the fitting is thus clamped against an outer surface 46 of pipe 14. A fusion element 48 molded into fitting 12 is activated in a manner known in the art so that the fusion element heats and fuses fitting 12 to pipe 14 along inner surface 44 and outer surface 46.

After the fusion operation has been carried out, clamping apparatus 10 is removed, and after this is done, pipe 14 may be "tapped" to form an opening 50 therein which is aligned with a central opening through fitting 12. In the case of an excavated pipe 14, it may be necessary to rebury it.

DESCRIPTION OF THE PREFERRED EMBODIMENT

Referring now to FIG. 2, the clamping apparatus of the present invention is shown and generally designated by the numeral 60. Clamping apparatus 60 is used to clamp a fitting 62 against a portion of a length of pipe 64. The configuration of fitting 62 and pipe 64, both of which are known in the art, is best seen in FIG. 3. Pipe 64 is usually substantially cylindrical and has an outer surface 66 and an inner surface 68. Fitting 62 has a saddle portion 70 with an inner surface 72 adapted for engagement with outer surface 66 of pipe 64. Fusing elements 74 are disposed in saddle portion 70 adjacent to inner surface 72, such as by molding or melting in, etc. Fusing element 74 are in electrical communication with electrical terminals or contacts 76, as seen in FIG. 2.

Extending from saddle portion 70 of fitting 62 is a neck portion 78 which, in the illustrated embodiment, is substantially cylindrical and defines a central opening 80 therethrough with an upper end 82 which may also be referred to as an outer surface 82 of fitting 62.

Referring again to FIG. 2, the details of clamping apparatus 60 of the present invention will be described. Apparatus 60 comprises a clamping plate 84 which is adapted for engagement with outer surface 82 of fitting 62. In the illustrated embodiment, there are a pair of shoulders 86 and 88 on the lower side of clamping plate 84. As will be further described herein, shoulders 86 and 88 are adapted for fitting within different inside diameters of central opening 80 in various sizes of fitting 62 and also to align clamping plate 84 with the fitting. The number of shoulders and the dimensions thereof may vary, and the invention is not intended to be limited to the exact configuration shown in the drawings.

Clamping plate 84 defines a central, threaded opening 90 therethrough.

A threaded adjusting stem 92 extends through clamping plate 84 and is threadingly engaged with threaded opening 90. A handle 94 is connected to the upper end of adjusting stem 92 and provides easy rotation of the adjusting stem, as will be further described.

At the lower of adjusting stem 92 is a swivel 96 which rotates about the longitudinal axis of the adjusting stem. Swivel 96 interconnects the lower end of adjusting stem 92 with a pivot 98. Pivot 98 pivots about an axis which is substantially perpendicular to the longitudinal axis of the adjusting stem. A locking or clamping bar 100 is attached to pivot 98. It will be seen by those skilled in the art that locking bar 100 is thus pivotally and rotatably connected to the lower end of adjusting stem 92 by pivot 98 and swivel 96, respectively. That is, locking bar 100 may still be pivoted in the axis perpendicular to the longitudinal axis of adjusting stem 92 about pivot 98, and the adjusting stem may be rotated about its longitudinal axis with respect to locking bar 100 by swivel 96.

As seen in FIGS. 2, 4 and 5, swivel 96 and pivot 98 are longitudinally fixed with respect to adjusting stem 92. That is, relative longitudinal movement between locking bar 100 and adjusting stem 92 is prevented.

Locking bar 100 has first and second ends 102 and 103. It will be seen that the portion of locking bar 100 which forms end 102 is longer than the portion of the locking bar which forms end 103. Thus, ends 102 and 103 may be referred to as long end 102 and short end 103. Of course, this means that long end 102 weighs more than short end 103 which tends to cause locking bar 100 to rotate in a clockwise direction as viewed in FIG. 2.

End 102 of locking bar 100 is operatively connected to clamping plate 84 by a cable assembly 104. Cable assembly 104 comprises a cable 106 with a first end 114 attached to a handle 116. A second end 118 of cable 106 is attached to end 102 of locking bar 100. As seen in FIG. 2, cable 106 is in a position which prevents the previously described clockwise rotation of locking bar 100.

Cable 106 extends through a hole 120 defined in clamping plate 84 and also through sleeve 108.

A locking nut 122 is threadingly engaged with the outer portion of adjusting stem 92 which extends from clamping plate 84, and the locking nut is used to lock adjusting stem 92 with respect to clamping plate 84 as will be further described herein.

OPERATION OF THE INVENTION

First, pipe 64 is prepared for receiving fitting 62. If pipe 64 is buried, only a portion thereof needs to be excavated. That is, it is not necessary to dig underneath the pipe as in the prior art because the apparatus of the present invention does not require the positioning of a support under the pipe. Outer surface 66 of pipe 64, and inner surface 72 of fitting 62 are cleaned and prepared in a manner known in the art.

An opening 123 is formed in pipe 14. Preferably, opening 123 is about the same size as central opening 80 in fitting 62.

The operation of clamping apparatus 60 and a corresponding method of clamping a fitting to a piece of pipe for electrofusion connection therebetween will now be described. Cable 106 is extended outwardly from clamping plate 84 by pulling on handle 116. This raises long end 102 of locking bar 100 so that locking bar 100 is in a mostly vertical first position as seen in FIG. 2. Locking bar 100, of course, is otherwise free to move because of its pivotal connection on pivot 98. Referring now to FIG. 4, clamping plate 84 is positioned against outer surface 82 of fitting 62. Shoulder 86 is preferably sized to fit just within central opening 80 of fitting 62, thereby generally centering clamping plate 84 with respect to neck portion 78 of fitting 62. Adjusting stem 92 is previously positioned so that most of its length extends downwardly from clamping plate 84. This is accomplished by rotating handle 94 as necessary, so that locking bar 100 is positioned downwardly far enough to clear opening 123 in pipe 64.

By moving handle 116, cable 106 is moved toward clamping plate 84 and downwardly through sleeve 108. Those skilled in the art will see that this allows the weight differential of locking bar 100 to pivot the locking bar clockwise about pivot 98 so that it is in the substantially horizontal second position seen in FIG. 4.

At this point, adjusting stem 92 is retracted with respect to clamping plate 84 by rotation of handle 94 until locking bar 100 is brought into engagement with inner surface 68 of pipe 64 as shown in FIG. 5. Handle 94 is thus rotated until clamping apparatus 60 firmly clamps fitting 62 against pipe 64. That is, clamping plate 84 clampingly engages outer surface 82 of fitting 62, and locking bar 100 clampingly engages inner surface 68 of pipe 64. Locking nut 122 is rotated on adjusting stem 92 to engage the upper side of clamping plate 84, again as seen in FIG. 5, so that apparatus 60 is firmly locked in place.

Electrical power is then applied to contacts 76 to energize fusing elements 74 which heat up and melt or soften the thermoplastic material of fitting 62 and pipe 64 so that the fitting and pipe are fusingly welded together. The actual fusing operation is in the same manner known in the art, and the specific details are not necessary to this disclosure.

After fusing is completed, electrical power is shut off from fusing element 74 so that the welded assembly of fitting 62 and pipe 64 may cool down.

Locking nut 122 is loosened so that adjusting stem 92 may be threaded back inwardly with respect to pipe 64 to the position shown in FIG. 4. At this point, cable 106 may be actuated so that locking bar 100 is pivoted to its mostly vertical first position, such as seen in FIG. 2. Clamping apparatus 60 may then be removed from fitting 62 and pipe 64.

It will be understood by those skilled in the art that the entire operation utilizing clamping assembly 60 is carried out from the upper side of pipe 64, and it is not necessary to further excavate the pipe if it is buried, and it is also not necessary to provide any support underneath the pipe. The clamping is all provided by apparatus 60 which clamps against outer surface 82 of fitting 62 and against inner surface 68 of pipe 64.

It will be seen, therefore, that the clamping apparatus for holding an electrofusing fitting to a length of pipe, as well as the method of use, are well adapted to carry out the ends and advantages mentioned, as well as those inherent therein. While a presently preferred embodiment of the apparatus and of steps in the method have been described for the purposes of this disclosure, numerous changes in the arrangement and construction of parts and of steps in the method may be made by those skilled in the art. All such changes are encompassed within the scope and spirit of the appended claims.

What is claimed is:

1. A method of attaching a fitting to a pipe comprising the steps of:

providing a pipe opening in the pipe;

positioning the fitting against an outer surface of said pipe such that a fitting opening defined in said fitting is substantially aligned with said pipe opening;

providing a clamping apparatus comprising:

a first portion adapted for engaging an outer surface of the fitting;

a second portion adapted for engaging an inner surface of pipe; and an adjusting stem threadingly engaged with said first portion, said second portion being connected to said adjusting stem by a swivel, such that the adjusting stem may be rotated about a longitudinal axis of the adjusting stem, and by a pivot, such that said second portion may be pivoted about an axis substantially perpendicular to said longitudinal axis;

positioning said clamping apparatus adjacent to said fitting such that said first portion of said clamping apparatus is adjacent to the fitting and a portion of said clamping apparatus extends through the aligned fitting and pipe openings such that said second portion of said clamping apparatus is adjacent an inner surface of the pipe; and actuating said clamping apparatus to a clamping position by rotating said adjusting stem while preventing longitudinal movement between said second portion and said adjusting stem such that said first portion of said clamping apparatus clampingly engaged said outer surface of said fitting and said second portion of said clamping apparatus clampingly engages said inner surface of said pipe, thereby clamping said fitting against said pipe.

2. The method of claim 1 further comprising the steps of:

providing said pipe made of a plastic material;

providing said fitting made of a plastic material and having a fusing element formed thereon; and activating said fusing element when said clamping apparatus is in said clamping position such that said fitting is fused to said pipe.

3. The method of claim 2 further comprising the steps of:

deactivating said fusing element;

actuating said clamping apparatus to an unclamped position by rotating said adjustment stem; and withdrawing said second portion of said clamping apparatus through said aligned fitting and pipe openings.

4. The method of claim 1 wherein:

said pipe is initially buried; and further comprising the step of excavating only a portion of said pipe prior to said step of providing a pipe opening in said pipe.

5. The method of claim 1 wherein said step of positioning said clamping apparatus comprises pivoting said second portion of said clamping apparatus with respect to said adjusting stem.

6. The method of claim 5 wherein said step of pivoting comprises applying tension to a cable attached to said second portion of said clamping apparatus.

* * * * *